Dec. 18, 1956          B. D. OWEN          2,774,623
BRACKET FOR SUPPORTING VEHICLE TOP BOW
Filed July 16, 1953          2 Sheets-Sheet 1
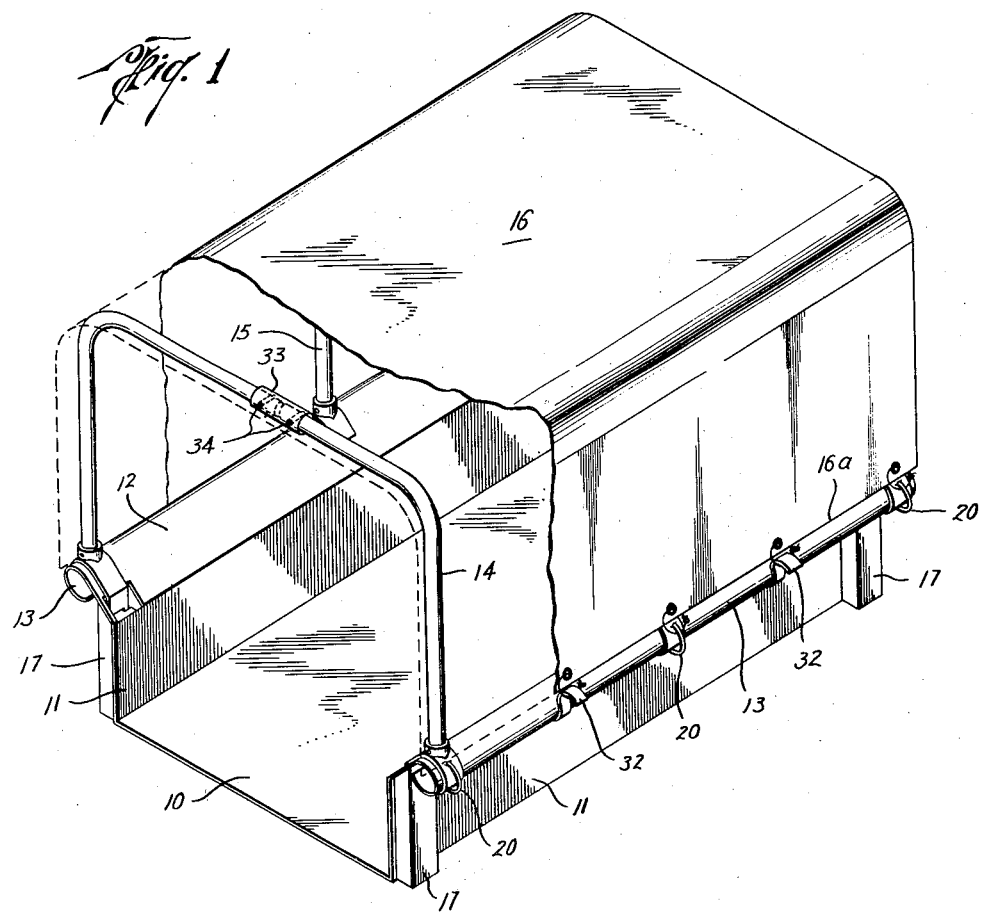
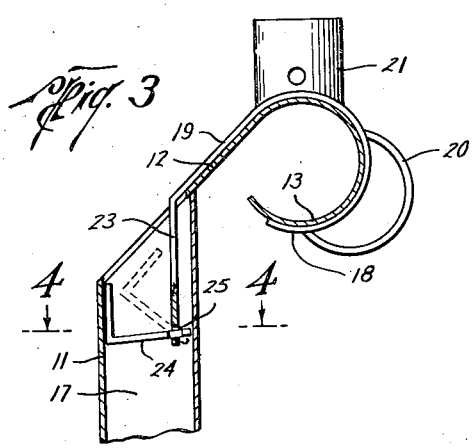
Bennie D. Owen
INVENTOR.
BY
ATTORNEYS

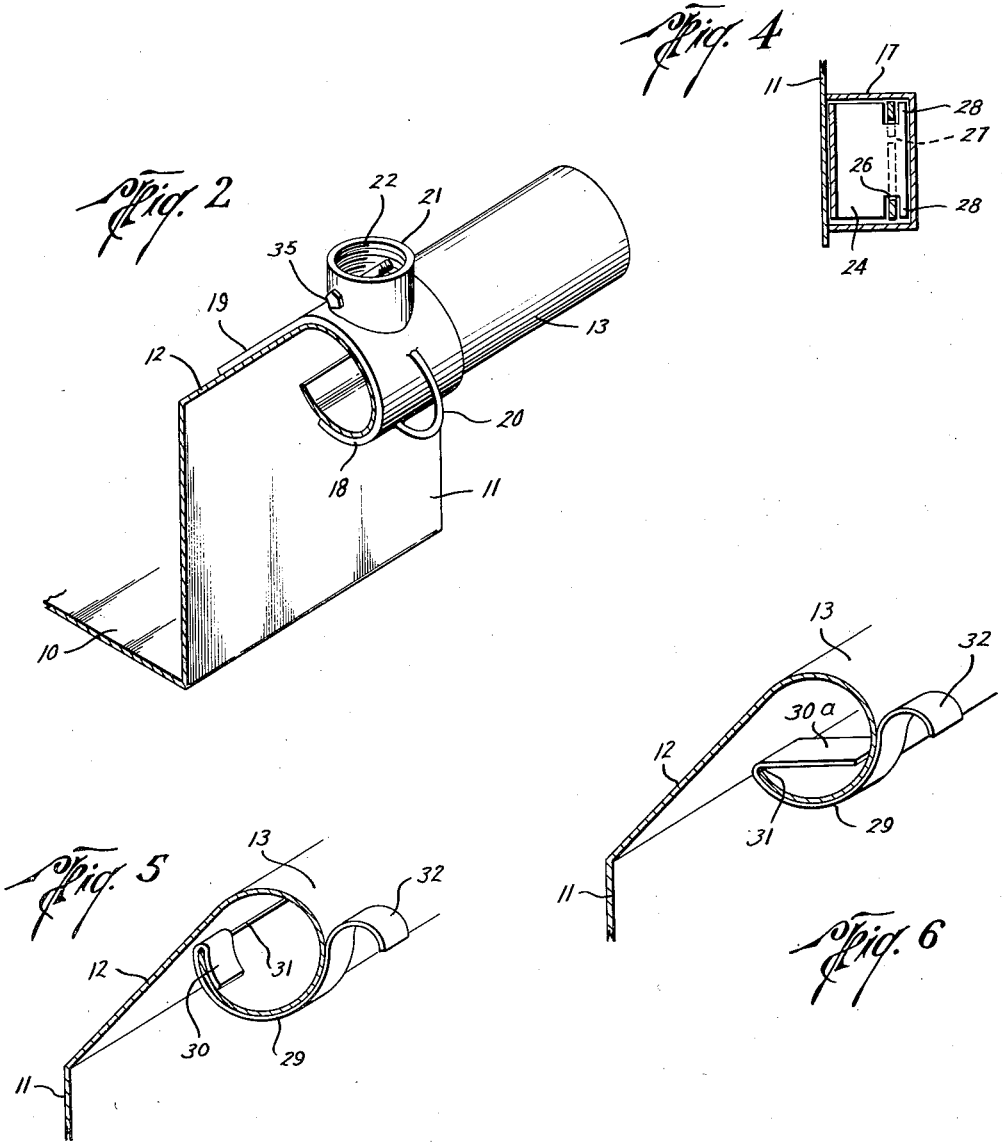

United States Patent Office 2,774,623
Patented Dec. 18, 1956

2,774,623

BRACKET FOR SUPPORTING VEHICLE TOP BOW

Bennie D. Owen, Houston, Tex.

Application July 16, 1953, Serial No. 368,334

6 Claims. (Cl. 296—104)

This invention relates to a bracket for use on a wall which terminates in an outturned rolled portion such as is provided on the sides of the cargo bodies of conventional pickup trucks. In one of its aspects it relates to a bracket to which may be secured a cargo tiedown line, a tarpaulin line or the like. In another of its aspects it relates to a bracket for securing a roof support, a tarpaulin supporting rib or the like to such a side wall.

In many instances vehicles such as pickup trucks, trailers and the like are provided with a cargo bed bordered on one or more sides by a side wall of sheet metal or the like which terminates in an outturned rolled portion to provide both additional strength in the side wall and to prevent damage being caused by the more or less sharp edge of the side wall. These side walls are also quite frequently fabricated with an upwardly and outwardly sloping section which terminates in such a rolled portion.

To satisfy the aesthetic taste of the purchasing public, present day vehicles of this general type are fabricated with smooth flowing lines wherever possible and generally there is little or no provision of tiedown means by way of eyes, slits or protrusions to which a line may be made fast. Thus, it is difficult to secure a tarpaulin over the cargo bed of the vehicle or to secure a cargo line to the vehicle body.

It is frequently desirable to provide a removable cover for the cargo bed of such vehicles. Such cover frequently takes the form of a light framework of arched or U-shaped ribs over the cargo bed covered by a tarpaulin or the like. There is no ready means available for securing such a framework to vehicles of the type described without bolting, welding or otherwise permanently securing the ribs or brackets therefor to the vehicle body. While stake boxes are often provided at the four corners of the cargo bed of a pickup truck, these boxes are usually of a size to receive a relatively heavy stake and are not adapted to snugly receive a light framework. It is desirable to utilize, insofar as possible, the space above the sloping wall sections of the side walls of a pickup truck. Usually the stage boxes open into the sloping wall section at a point some distance inboard of the rolled portion and when ribs are anchored in these boxes they interfere with the free use of the space above the sloping wall sections. An additional objection is that if a tarpaulin is to lie against the leg portions of the ribs, water shed by the tarpaulin will be deflected by the sloping wall section into the cargo bed.

It is an object of this invention to provide a bracket which is adapted to be carried by the rolled portion of the side wall of a vehicle of the type described without bolting, welding or otherwise permanently securing the bracket to the vehicle.

Another object is to provide a bracket for a vehicle of the type described which is adapted to be carried by the rolled portion of the side wall without being permanently secured thereto, and which provides a tie to which a line may be secured.

Another object is to provide a bracket which is adapted to be carried by the rolled portion of the side wall of a vehicle without being permanently secured thereto, and which will support one end of a member which is adapted to support a cover over the cargo bed of a vehicle.

Another object is to provide a bracket for a vehicle of the type described which is adapted to be carried by the rolled portion of the side wall of the vehicle to support one end of a rib and provide a tie to which a tarpaulin stretched over such rib may be secured, the construction of the bracket being such that water shed by the side wall of the tarpaulin will not be deflected into the truck bed by the side wall.

Another object is to provide a bracket which is adapted to be carried by the rolled portion of the side wall of a vehicle of the type described in which the bracket may be secured against movement along the rolled portion without bolting, welding or otherwise permanently securing the bracket to the vehicle.

Another object is to provide a bracket which is adapted to be carried by the rolled portion of the side wall of a vehicle of the type described in which the bracket may be releasably secured against movement along or about the rolled portion without bolting, welding or otherwise permanently securing the bracket to the vehicle.

Other and further objects will appear as the description proceeds.

In the drawings wherein like reference numerals indicate like parts and wherein there is illustrated by way of example several brackets embodying this invention:

Fig. 1 is a diagrammatic view of the cargo bed of a vehicle such as a pickup truck, trailer, or the like, illustrating the use of various types of brackets contemplated by this invention in supporting and positioning a tarpaulin over the cargo bed of the vehicle;

Fig. 2 is a diagrammatic view of a form of bracket which may be utilized at any position along the rolled portion of the side wall of the vehicle to provide a tie and to receive one end of a rib or the like;

Fig. 3 is an end view of the form of bracket preferred for use at the four corners of the cargo bed illustrating the manner in which the anchoring portion of the bracket extends into the stake box of the vehicle body, and further illustrating the operation of the latching means maintaining the anchoring portion of the bracket in the stake box;

Fig. 4 is a view along the line 4—4 of Fig. 3 in the direction of the arrows;

Fig. 5 is a diagrammatic view of a form of bracket which may be utilized at any position along the rolled portion of the side wall of the vehicle to provide a tie; and Fig. 6 is a diagrammatic view of still another form of bracket which may be utilized at any position along the rolled portion of the side wall of the vehicle to provide a tie.

Referring to Fig. 1 of the drawings, the numeral 10 indicates the cargo bed of a vehicle such as a pickup truck, trailer or the like, bordered by side walls 11 whose uppermost sections 12 slope upwardly and outwardly from the bed and terminate in outturned, horizontally extending, rolled portions 13. It will be noted that the bed and side walls are in the form generally utilized by present day pickup trucks and the bed will be hereinafter referred to as a pickup truck cargo bed.

Each of the forms of brackets illustrated is slidably received about the rolled portion 13 of the side wall and provides a support or tying base for a top or cover which includes ribs 14 and 15, and tarpaulin 16. Brackets of the type illustrated in Fig. 3 are positioned at the four corners of the truck bed and utilize the stake boxes 17 to prevent movement of the brackets along the rolled portion 13 as will hereinafter be more fully described. The form of bracket illustrated in Fig. 2 might be used at the corners but the bracket of Fig. 3 is preferred as it is positively but releasably anchored against movement along the rolled portion 13, while the Fig. 2 modification is only held against endwise movement by friction, when under a load. The canvas 16 may be anchored to and stretched between these brackets and the ribs 14, one of which is shown and one of which is concealed by the tarpaulin 16. The form of bracket illustrated in Fig. 2 is preferably utilized only to carry an intermediate rib 15 and to provide a tie for the canvas intermediate the ends of the truck bed. While only one intermediate rib is shown it will be understood that several might be utilized if desired and that these ribs will be spaced along the sidewall 11 by securing the tarpaulin to the tie carried by each of these brackets. Brackets of the form illustrated in Figs. 5 and 6 may be utilized at positions intermediate the rib supporting brackets to provide as many ties for the tarpaulin as desired.

Referring to Fig. 2, the bracket includes a circular body section 18 whose inner circumferential face conforms to and is adapted to engage the outer circumferential face of the rolled portion 13 of the side wall 11. It will be noted that body portion 18 engages the rolled portion 13 below a horizontal diametral plane of the rolled portion so that the bracket is held against movement upwardly relative to the vehicle. In this form of bracket the body portion 18 is preferably formed about an arc in excess of 180° to prevent any lateral movement of the bracket relative to rolled portion 13 due to the weight supported by the bracket.

Inasmuch as rolled section 13 of the wall and the body section 18 of the bracket are concentric, the bracket is rotatable relative to the rolled portion. If a cargo line or tarpaulin line is secured to the outboard portion of the bracket, that is, outboard relative to the cargo bed, the bracket will tend to rotate in a counterclockwise direction as viewed in Fig. 2. To limit such rotation a stop is provided. The stop in this embodiment is provided by a section 19 extending from one end of the circular body section 18 and engageable with the upper face of the sloped wall section 12. Preferably, stop 19 has a flat lower face which conforms to the upper face of sloped wall section 12. With this construction a cargo line or a line from a tarpaulin will tend to rotate the bracket in a counterclockwise direction as viewed in Fig. 2 and stop 19 will engage sloped wall portion 12 to limit rotation of the bracket. The frictional engagement of the bracket and the rolled portion 13 will tend to prevent endwise movement of the bracket along the rolled section when a line has been made fast to the bracket.

A tie down means is carried by the bracket at a position which is outboard of the zenith of the rolled portion 13 when the stop is engaged, that is, clockwise of the zenith of the rolled portion as viewed in Fig. 2. With the tie down means so positioned the force exerted by a tarpaulin or cargo line will be absorbed in large measure by the stop. The lower edge 16a of the side portion of tarpaulin 16 will be held outwardly of the summit of rolled portion 13 and water shed by the tarpaulin will not fall on the sloping wall section 12 and be deflected into cargo bed 10.

The tie down means may take the form of a tie down eye 20 which is formed of a U-shaped member having its legs welded or otherwise secured to the body portion 18 of the bracket. Eye 20 is positioned outboard of the zenith of the bracket when the stop 19 and the sloped wall portion 12 are in engagement. While the tie down eye is illustrated as being as far outboard from the bed of the truck as possible it will be appreciated that the eye could be positioned at any point on the bracket clockwise from the zenith of the bracket as viewed in its Fig. 2 position.

The bracket thus far described will provide a very strong and reliable base for a cargo line. However, in order that this type of bracket might be utilized for both securing a cargo in the bed and for supporting and securing a tarpaulin over the bed there is provided an upstanding socket 21 for receiving the butt end of an arched rib, U-shaped pipe or the like upon which a tarpaulin may be stretched. The inner bore of upstanding socket 21 may be provided with threads 22 into which the butt ends of rib 15 may be screwed. Socket 21 is also provided with a pair of registering holes at diametrically opposed points on the socket through which a bolt 35 may pass. If desired, the ribs 15 may have plain ends and have a sliding fit with socket 21. In this form the bolt 35 will pass through registering holes in rib 15 and serve to maintain the rib in socket 21.

Fig. 3 illustrates the type of bracket preferred for use at the four corners of the pickup truck bed. This bracket is similar to the bracket of Fig. 2, having the added feature of an anchoring means adapted to prevent movement of the bracket along the rolled portion 13 of the pickup truck body and a latch which in its solid line position will prevent rotation of the bracket about the rolled portion 13 and in its dotted line position will permit such rotation of the bracket. The anchoring means is provided by a leg 23 which depends from the stop member 19 and is adapted to extend into the conventional stake box 17. The length of anchoring leg 23 is such that it will just clear side wall 17 of the truck as the bracket is rotated about the rolled portion 13. Leg 23 will prevent movement of the bracket along the rolled portion so long as the bracket is in a rotative position in which the anchoring leg extends into the stake box.

The latch may take the form of angle member 24 having one leg hinged to anchoring leg 23. The free leg of the latch should extend upwardly so that latch 24 may be moved about its hinge in a clockwise direction until the free leg abuts the depending anchor member 23. The angle member 24 should be dimensioned to clear the side wall 11 upon rotation of the bracket about the rolled portion 13 when the latch is in its raised position.

Preferably the angle formed by the two legs of latch member 24 is slightly less than a right angle and the parts of the bracket are so dimensioned that angle member 24 will engage side wall 11 along a short length of its travel during movement of the angle member into and out of latching position. The hinge leg of the latch moves through a line perpendicular to side wall 11 when moved between latched and unlatched position and the engagement between the latch and side wall occurs as the latch is moving through such perpendicular line. Preferably the hinge leg of the latch is of a length to require that the latch be forced into and out of latched position to prevent accidental release of the latch.

A simple type of hinge is shown in which the anchoring leg 23 of the bracket is provided with a horizontal slotway 25 and the latch 24 is provided with a tongue portion 26 which loosely fits in slotway 25. Depending leg 23 is slit from its lowermost edge to the slotway as at 27 so that a portion of the leg 23 below the slotway may be bent into an out-of-the-way position and tongue 26 inserted into the slotway. The bent portion of depending leg 23 is then returned to its original position and outwardly extending lugs 28 carried by tongue 26 will maintain the tongue in the slotway of depending leg 23.

It will be appreciated that with the form of bracket illustrated in Fig. 3 stop 19 will prevent counterclockwise rotation of the bracket about the rolled portion, the depending anchoring leg 23 will prevent movement of the bracket along the rolled portion 13 and the latch 24 will prevent clockwise rotation of the bracket about the rolled portion 13, resulting in a bracket which is fixed against movement in all directions without in anywise being permanently secured to the body as by bolting, welding or the like. The use of the latching means is considered advisable where possible as it both prevents accidental removal of the anchoring leg 23 from the stake box and additionally provides considerable stability to the rib 14. Referring to Fig. 1 and to rib 14 carried by a pair of brackets such as shown in Fig. 3, it will be appreciated that a force exerted upon the rib along the axis of the closed or top portion of the inverted U will be opposed on one side by the stop means 19 engaging wall section 12 and on the other side of the truck body this force would be opposed by the latch 24 engaging side wall 11. If the latch is omitted then such a force would be resisted on only one side of the pickup truck body as the other bracket would be free to rotate about the rolled portion 13. Therefore, if holding on one side only is considered sufficient under specified circumstances the latch may be omitted.

Fig. 5 illustrates a form of bracket which may be used to provide a tie for a line from a tarpaulin or a cargo line. The bracket illustrated in this figure is smaller and less expensive to manufacture than the brackets of Figs. 2 and 3 and is preferred as a tie for the tarpaulin intermediate the rib supporting brackets.

It will be noted that the rolled portion 13 extends about an arc of substantially 360° with the end 31 of the side wall terminating at the sloping wall portion 12. The bracket of Fig. 5 utilizes the end 31 to engage a portion of the bracket to provide a stop means limiting rotation of the bracket about the rolled portion in one direction. The bracket includes a circular body section 29 having its inner circumferential face conforming to and adapted to engage the outer circumferential face of the rolled portion 13 below a horizontally extending diametral plane of the rolled portion. At one end of the body section there is provided a stop portion 30 which is turned back upon the body portion 29 to form a substantially U-shaped member adapted to slide over the end 31 of the rolled portion, with body section 29 and a part of portion 30 on opposite sides of the end 31. Portion 30 is of sufficient length to engage a substantial portion of the inner circumferential face of the rolled portion 13 and maintain the bracket upon the rolled portion of the side wall.

At the other end of the body portion 29 there is provided a reversed curve section 32 located outboard of the zenith of rolled portion 13 when stop 30 and end 31 are in engagement. Reversed curve section 32 provides a tie to which a line may be secured.

Fig. 6 shows a bracket which is quite similar to the bracket of Fig. 5 which is preferred when the end 31 of the side wall is spaced from the sloped wall section. The stop is provided by a member 30a which passes through the gap between the end 31 of the side wall and the sloping portion 12 of the side wall. Member 30a is substantially straight and extends along a cord line of the circle about which the circular body section 29 is formed to a point just short of the circular body portion to leave a slight gap therebetween to receive a portion of the rolled member 13. This form of clamp requires more metal to fabricate than the clamp of Fig. 5 but the extended member 30a will positively retain the bracket on the rolled portion 13 when the bracket is not in use.

Referring now to Fig. 1, it is believed apparent how the various clamps illustrated function to maintain the tarpaulin 16 above the bed 10 of the pickup truck. Considering the brackets and ribs to all be placed upon the truck bed from the rear or left-hand end of the truck bed as viewed in Fig. 1, a pair of brackets such as illustrated in Fig. 3 would be selected, slid over the rolled section of the body and positioned with their anchoring legs in the stake boxes at the front end of the cargo bed. In the event a rib with a sliding fit in the socket 21 is to be utilized the rib may be positioned in sockets 21 and secured in place by bolts 35. In the event it is desired to use ribs which are threadedly received in sockets 21 it is desirable to divide the rib. The parts may then be joined by a collar 33 into which the divided ends of the rib may extend and be secured by bolts 34 which extend through registering holes in the rib and collar. With this arrangement the brackets of Fig. 3 may be slid into place with the half sections of the ribs made up in the brackets or the half sections may be made up in the brackets after the brackets have been positioned in stake boxes 17. In either event, the divided ends of the half rib sections are secured together by collar 33 after the remaining portion of the assembly has been made. It will be understood that where wooden or other resilient type ribs are utilized which may be deformed sufficiently to allow the bracket of Fig. 3 to be slid along the rolled portion 13 of the side wall, the split rib and collar 33 may be dispensed with. One or more of the brackets illustrated in Figs. 5 and 6 may be slid along the rolled portion of the side wall on each side of the truck body to provide a tie adjacent the front brackets. The intermediate rib 15 is now made up in brackets of the type illustrated in Fig. 2 and the pair of brackets and the rib assembled together slid into their approximate position along the pickup truck bed. Again the desired number of brackets of the type shown in Figs. 5 and 6 are positioned on each side of the truck to provide ties. Finally, the rear rib support utilizing again the type of brackets illustrated in Fig. 3 and the split rib is positioned at the rear of the truck. Canvas 16 is then stretched over the ribs and secured along each side to the ties provided by eyes 20 and reversed curve portions 32 of the several brackets.

It will be appreciated that with the canvas held in place by the assembly described above that the supporting ribs at each end of the pickup truck bed are held against movement along the rolled portion of each side wall and the ties provided by each of these four brackets will maintain the canvas in position. The ties provided on the brackets supporting the intermediate rib will both hold the canvas stretched over the rib and prevent movement of the rib along the rolled portion.

While the above description of the brackets has been directed primarily to their utility in positioning a tarpaulin over the cargo bed of a vehicle, it will be understood that the brackets are equally useful for securing a cargo in the truck bed or for any other purpose for which brackets of this general type may be utilized.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A bracket suitable for use on the wall of a vehicle body or the like, which wall has an upper section sloping upwardly and outwardly and terminating along its upper edge in an outturned, horizontally extending, rolled portion, and wherein a stake box is carried by the side wall, said bracket comprising, a circular body section having its inner circumferential face conforming to and adapted to slidably engage the outer circumferential face of said rolled portion about an arc in excess of 180°, a flat section extending from one end of the circular body portion and engageable with the upper surface of the sloped portion of said side wall to provide a stop limiting rotation of the bracket in one direction, a tie down eye carried by the bracket outboard of the zenith of the rolled portion with the stop means engaged, an anchoring leg carried by the flat section and extending into the stake box when the stop means is engaged to prevent movement of the bracket along the rolled portion, said anchoring leg having a length dimension which will clear the wall of the stake box most remote from said rolled portion as the bracekt is rotated about the rolled portion to remove the anchoring leg from the stake box, said bracket when rotated about the rolled portion to remove the anchoring leg from the stake box being slidable along the rolled portion of the side wall.

2. The bracket of claim 1 wherein the bracket carries a rib receiving socket.

3. The bracket of claim 1 wherein the anchoring leg is provided with a latch movable into a first position to prevent removal of the anchoring leg from the stake box and movable to a second position to allow removal of the anchoring leg from the stake box by rotation of the bracket about the rolled portion of the side wall.

4. The bracket of claim 3 wherein the latch is provided by an angle member having one leg hinged to the anchoring leg of the bracket.

5. The bracket of claim 3 wherein the anchoring leg of the bracket is provided with a horizontally extending slotway and the latch comprises an angle member having a tongue loosely received in said slotway to provide a hinge between the anchoring leg of the bracket and the latch.

6. A bracket suitable for use on the wall of a vehicle body or the like, which wall has an upper section sloping upwardly and outwardly and terminating along its upper edge in an outturned, horizontally extending, rolled portion of slightly less than 360° to provide a space between the end of the rolled portion and the sloped section, said bracket comprising, a circular body section having its inner circumferential face conforming to and adapted to engage the outer circumferential face of the rolled portion below a horizontally extending diametral plane of the rolled portion, a portion carried at one end of the body section and extending through the space between the end of the rolled portion and the sloped section of the side wall to provide a stop means limiting rotation of the bracket about the rolled portion in one direction, and a reversed curve section extending from the other end of the body section to provide a tie down means, said bracket being slidable along the rolled portion to provide a means for securing a tie to the vehicle body at a desired position along the rolled portion.

References Cited in the file of this patent

UNITED STATES PATENTS

| | | |
|---|---|---|
| 435,173 | Forbes | Aug. 26, 1890 |
| 1,729,555 | Sparshatt | Sept. 24, 1929 |
| 1,856,847 | Gates | May 3, 1932 |
| 2,262,129 | Andrews | Nov. 11, 1941 |
| 2,465,621 | Wheeler | Mar. 29, 1949 |
| 2,494,881 | Kost | Jan. 17, 1950 |
| 2,516,713 | McClure | July 25, 1950 |
| 2,535,242 | Stuart | Dec. 26, 1950 |